May 21, 1940.  W. E. FIELDS  2,201,612
BRAKE
Filed Oct. 30, 1936   3 Sheets-Sheet 1
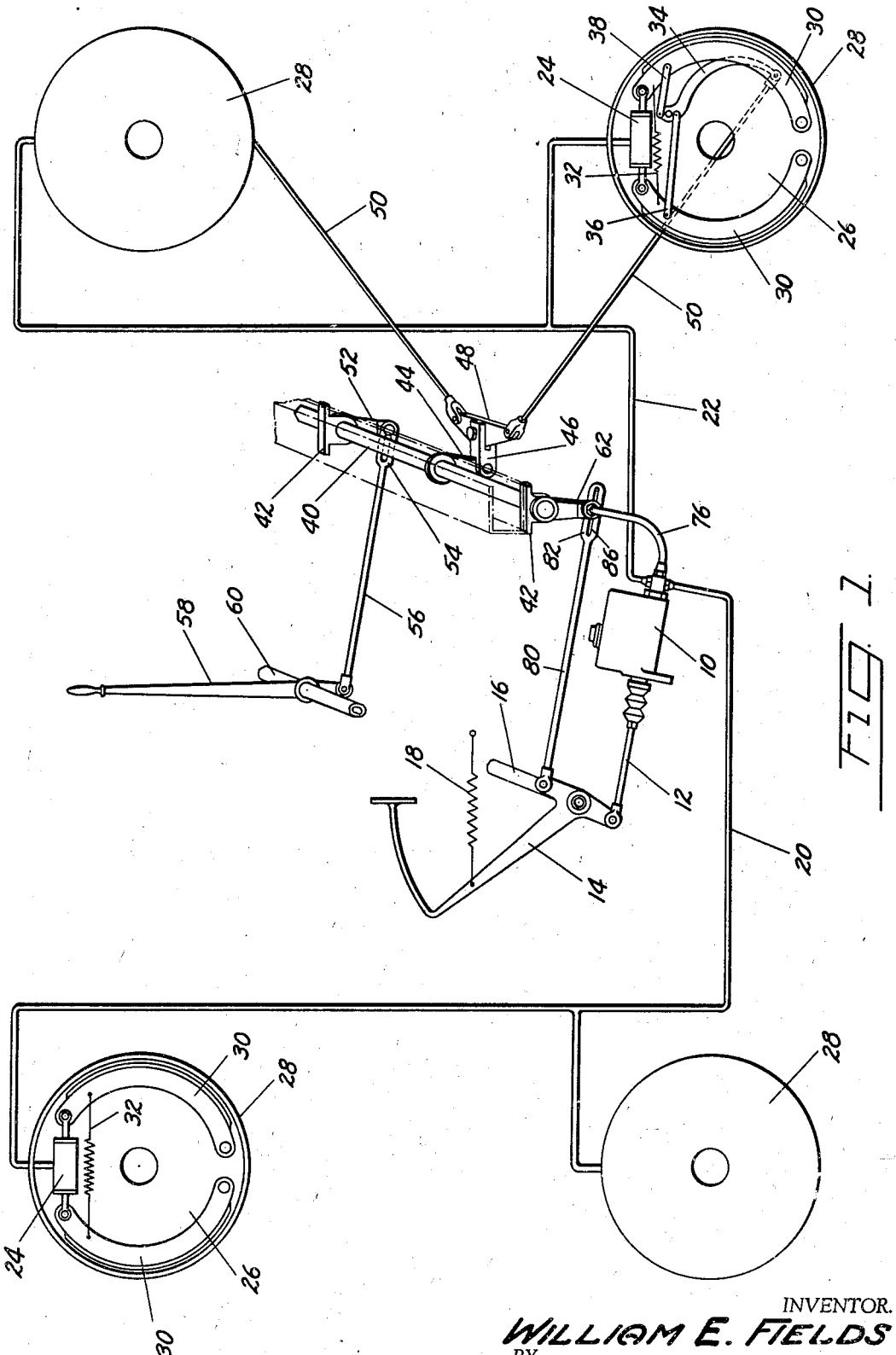
INVENTOR.
WILLIAM E. FIELDS
BY Jerome R. Cox.
ATTORNEY.

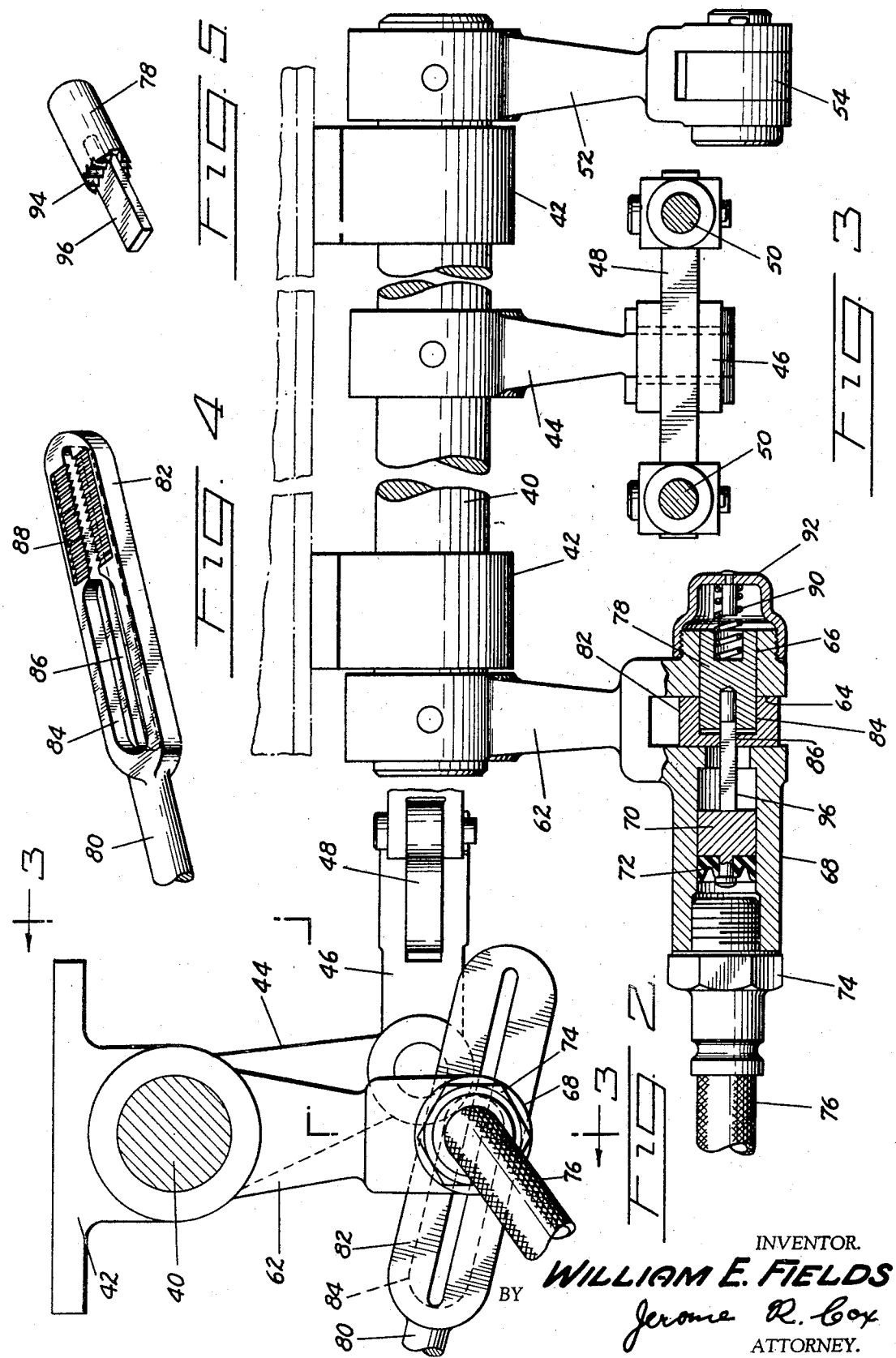

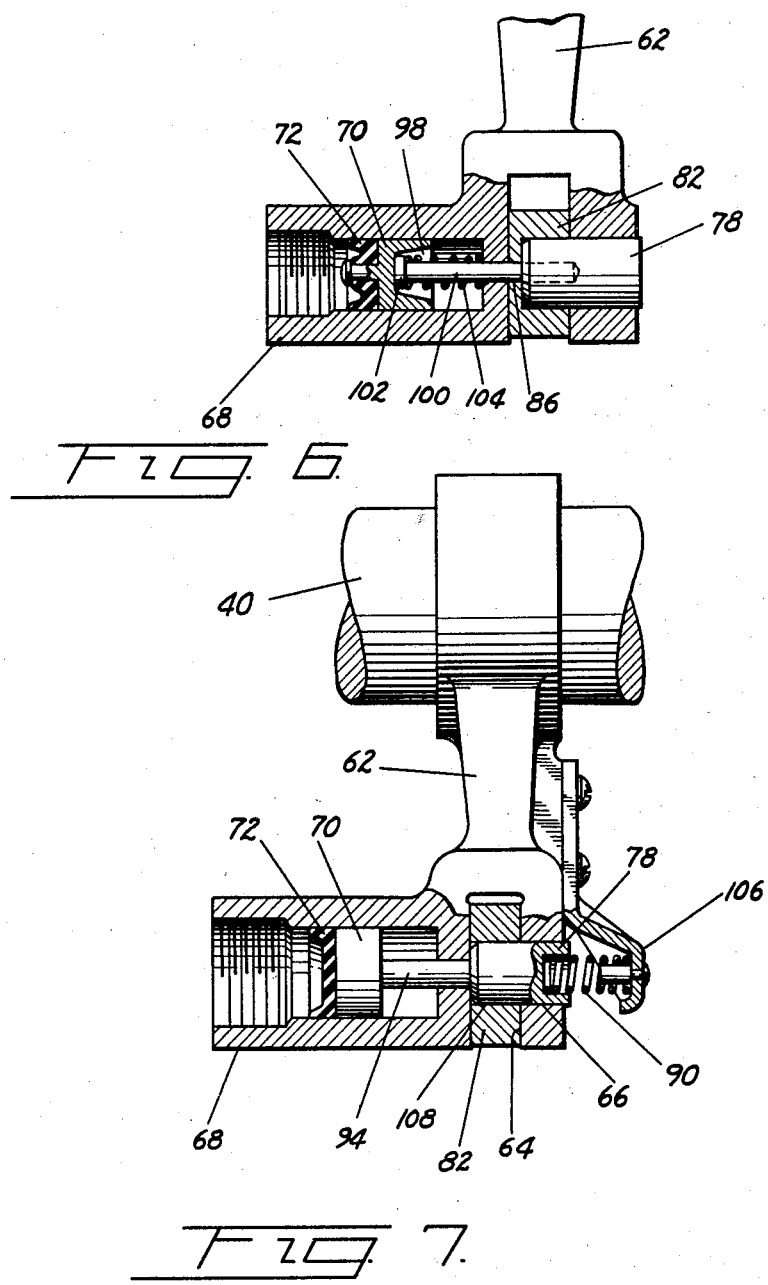

Patented May 21, 1940

2,201,612

UNITED STATES PATENT OFFICE 2,201,612

BRAKE

William E. Fields, South Bend, Ind., assignor to Bendix Products Corporation, South Bend, Ind., a corporation of Indiana Application October 30, 1936, Serial No. 108,346

8 Claims. (Cl. 188—106)

This invention relates to braking systems for motor vehicles.

Broadly the invention comprehends a duplex braking system including a fluid pressure braking system for actuating the service brakes of a motor vehicle and a mechanical braking system for actuating at least a pair of the same set of brakes as an emergency or parking brake, and to so couple the two systems that they may be independently operated; and in case of failure of the fluid pressure braking system the mechanical braking system is automatically brought into action.

An object of the invention is to provide a duplex braking system, one for actuating the service brakes of a motor vehicle, and another for actuating at least a pair of the same brakes as an emergency or parking brake.

Another object of the invention is to provide a duplex braking system for a motor vehicle including one system for actuating the service brakes and another system for actuating the emergency or parking brake, and to so couple the two systems that in the event of failure of one system the other system is automatically brought into action.

A further object of the invention is to provide a duplex braking system including a fluid pressure braking system for actuating the service brakes of a motor vehicle and a mechanical braking system for actuating at least a pair of the same brakes as emergency or parking brakes, and to so couple the two systems that they may be independently operated; and that in case of failure of the fluid pressure actuating system the mechanical braking system is immediately brought into action without loss of pedal travel.

Other objects of the invention will appear from the following description taken in connection with the drawings forming a part of this specification, and in which—

Fig. 1 is a diagrammatical illustration of a braking system embodying the invention;

Fig. 2 is an enlarged detail view of the coupling between the fluid pressure braking system and the mechanical braking system.

Fig. 3 is an enlarged detail view with parts broken away and parts in section illustrating the operating shaft of the mechanical braking system and the connections between the fluid pressure braking system and the mechanically actuated means;

Fig. 4 is a perspective view of the overrunning connection between the fluid pressure means and the mechanically actuated means;

Fig. 5 is a perspective view of a locking pin or plunger constituting a part of the overrunning connection;

Fig. 6 is a modification of the coupling between the fluid pressure actuated system and the mechanically operated system; and Fig. 7 is another modification of the coupling between the fluid pressure braking system and the mechanically actuated braking system.

Referring to the drawings for more specific details of the invention, 10 represents a fluid pressure producing device of conventional type such as are generally found in the assembly of fluid pressure braking systems for motor vehicles. Such devices are universally secured in a fixed position on the chassis frame of a motor vehicle and connected as by an operating rod 12 to a foot pedal lever 14 pivotally mounted on a stub shaft 16 and connected by a retractile spring 18 to a fixed support.

The fluid pressure producing device 10 has connected thereto fluid pressure delivery pipes or conduits 20 and 22, each having branches connected respectively to fluid pressure actuated motors 24 for actuating the brakes associated with the wheels of a motor vehicle. The motors 24 are arranged in pairs, one pair for actuating the brakes associated with the front wheels of the vehicle, and another pair for actuating the brakes associated with the rear wheels of the vehicle.

The brakes associated with the front wheels of the vehicle may be of any preferred type including a fixed support or backing plate 26, a rotatable drum 28 associated therewith, a pair of corresponding interchangeable friction elements or shoes 30 arranged on the backing plate for cooperation with the braking surface of the drum, and a motor corresponding to the motors 24 mounted on the backing plate between the shoes and operative to move the shoes into engagement with the drum against the resistance of a retractile spring 32 connecting the shoes.

The brakes associated with the rear wheels of the vehicle are like in structure to those associated with the front wheels of the vehicle with the exception that they are provided with an auxiliary actuating means for moving the shoes into engagement with the braking surface of the drum against the resistance of the retractile springs. As shown, the auxiliary actuating means includes a lever 34 pivoted on the backing plate 26 and connected by links 36 and 38 to the respective shoes 30, so that upon actuation of the lever 34 force is transmitted therefrom in opposite directions through the links 36 and 38 resulting in spreading the shoes into engagement with the braking surface of the drum.

The mechanical braking system for the emergency or parking brakes includes a cross shaft 40 rotatably mounted on brackets 42 on the frame of the chassis. An arm 44 suitably keyed to the shaft 40 has pivotally connected thereto a link 46 pivotally supporting an equalizing bar 48 having its respective ends connected as by cables 50 to the actuating levers 34 of the respective brakes associated with the rear wheels of the vehicle.

An arm 52 suitably keyed to one end of the shaft 40 is attached by an overrunning connection 54 to one end of a rod 56, and the other end of this rod is pivotally attached to an operating lever 58 pivoted on a fixed support 60. Suitably keyed to the other end of the shaft 40 is an arm 62, bifurcated or slotted as indicated at 64 and transversely bored as at 66.

Formed integral with the arm 62, normal thereto and concentric to the bore 66, is a cylinder 68 having therein a reciprocable piston 70 carrying on its head a leak-proof cup 72; and a hollow plug 74 threaded into the open end of the cylinder is connected by a flexible conduit 76 to the fluid pressure producing device 10 of the fluid pressure braking system. A spring-pressed plunger 78, reciprocable in the bore 66, is operatively connected to the piston 70, and an operating rod 80 has one of its ends slidably connected to the plunger within the slot 64 and its other end pivotally connected to the foot pedal lever 14.

As shown, the rod 80 has a flattened end portion 82 provided with a longitudinal recessed portion 84, a longitudinal slot 86, and a ratchet 88. The plunger 78 is normally held in the longitudinal recess 84 by a spring 90 interposed between the back of the plunger and a cap 92 threaded on the boss on the arm 62. The plunger 78 has on its head a ratchet for cooperation with the ratchet 88 on the flattened portion 82 of the rod 80, and a pin 96 extending through the slot 86 in the flattened portion of the rod 80 into the cylinder 68 where it engages the piston 70 reciprocable in the cylinder 68.

Modifications of the plunger and actuating means therefor are illustrated in Figs. 6 and 7. In the former of these modifications the piston 70 has in its back a recess 98. A pin 100 secured in the head of the plunger 78 extends through the slot 86 in the flattened portion 82 of the rod 80. This pin has on its free end a head 102 seated in the recess 98 and sleeved on the pin between the head thereof and the head of the cylinder is a spring 104. This spring serves to urge the plunger 78 to its seat in the slot in the flattened portion of the rod 80.

In the latter of these modifications the structure is substantially the same as that shown in the preferred embodiment. The only difference in structure is to be found in the abutment 106 for the spring 90 and in the increased dimensions of the slot 108 in the flattened portion 82 of the rod 80.

In a normal operation of the service brakes, upon depressing the foot pedal lever 14, force is transmitted from the lever through the rod 12 to the fluid pressure producing device 10 causing actuation of the device. This results in displacement of fluid from the device through the fluid pressure delivery pipes or conduits 20 and 22 and the branches of these conduits into the fluid pressure actuated motors 24, causing actuation of the motors resulting in movement of the shoes 30 of the brake structure into engagement with the braking surface of the drums 28 against the resistance of the retractile springs 32.

Upon completion of the braking operation, the operation releases the applied force on the pedal 14, and immediately the pedal is returned to its retracted position under the influence of the retractile spring 18. When the pedal returns to its retracted position, the fluid in the fluid pressure actuated motors 24 is returned therefrom by way of the conduits 20 and 22 to the fluid pressure producing device 10, and this completes the cycle of operation of the service brake.

In the operation of the emergency or parking brake, upon actuation of the operating lever 58, force is transmitted therefrom through the rod 56 to the arm 52 on the shaft 40, resulting in rocking the shaft. This movement of the shaft is transmitted through the arm 44 on the shaft, the link 46 connected to the arm, the equalizing bar 48 pivoted on the link, and the cables 50 connected to the equalizing bar of the actuating levers 34 of the rear brake structures.

Upon actuation of the levers 34, force is transmitted from these levers through the links 36 and 38 to the shoes 30 of the rear brake structures, resulting in moving the shoes into engagement with the drums 28. Upon release of the lever 58, the lever is returned to its retracted position under the influence of a retractile spring, not shown. As the lever 58 returns to its retracted position, the shoes 30 and the actuated levers 34 are also returned to their normal positions under the influence of the retractile springs 32 connecting the respective pairs of shoes. This completes the cycle of operation of the emergency or parking brake operation.

During a normal operation of the service brake, fluid under pressure from the fluid pressure producing device 10 is received in the cylinder 68 carried on the arm 62 on the rock shaft 40 of the mechanically actuated emergency or parking brake system. This causes actuation of the piston 70 resulting in disengaging the plunger 78 from the flattened end portion 82 of the rod 80 so that movement of the rod 80 instigated by movement of the pedal 14 is not transmitted to the arm 62 and through this arm to the shaft 40 of the mechanically actuated brake system,— hence the independence of operation of the two systems.

Should the service brakes fail during a braking operation due to leakage or breakage, the loss of pressure on the fluid incident thereto results in the release of the piston 70 and consequently release of the plunger 78. The spring 90 then becomes effective to immediately move the plunger 78 so as to engage the ratchet 94 on the head of the plunger with the ratchet 88 on the flattened end portion 82 of the rod 80 so as to effectively couple the mechanically actuated brake to the foot pedal 14.

The emergency or parking brake is thus brought into action without loss of pedal travel because the rear brakes have been previously applied by the fluid pressure actuated braking system and all slack in the mechanically actuated braking system eliminated by the initial movement of the foot pedal lever 14 and its connections with the arm 62. During this operation the overrunning connection 54 between the arm 56 and the arm 52 on the shaft 40 provides for rocking the shaft without disturbing the operating lever 58 of the emergency or parking braking system.

Although this invention has been described in connection with certain specific embodiments, the principles involved are susceptible of numerous other applications that will readily occur to persons skilled in the art. The invention is therefore to be limited only as indicated by the scope of the appended claims.

Having thus described the various features of the invention, what I claim as new and desire to secure by Letters Patent is:

1. A braking system comprising fluid pressure producing means, fluid pressure actuated means connected thereto, braking elements actuated thereby, mechanical means for actuating the braking elements, independent operating means for the pressure producing means and mechanical means, and means dependent upon the fluid pressure of said fluid pressure producing means and effective for instantaneously coupling the mechanical means to the operating means of the pressure producing means upon failure of the pressure producing means, said coupling means being effective without release of the brakes if said failure takes place while the brakes are applied.

2. A braking system comprising fluid pressure producing means, braking elements actuated thereby, mechanical means for actuating the braking elements, an actuator for the pressure producing means, and means for automatically coupling the mechanical actuating means to the actuator upon failure of the pressure producing means, said last-described means comprising a link connected to the actuator, a lever connected to the mechanical means, a pin slidably mounted in said lever and connecting the link thereto, and fluid pressure means for sliding said pin to disconnect said link actuated by the pressure producing means, and spring means for returning the pin.

3. A braking system comprising fluid pressure producing means, braking elements actuated thereby, mechanical means for actuating the braking elements, an actuator for the pressure producing means, an actuator for the mechanical means, and means dependent upon the fluid pressure of said fluid pressure producing means for instantaneously coupling the mechanical means with the actuator for the pressure producing means upon failure of the pressure producing means, said coupling means being effective without release of the brakes if said failure takes place while the brakes are applied.

4. A braking system comprising a fluid pressure producing means, fluid pressure actuated means connected thereto, braking elements actuated by the fluid pressure actuated means, mechanical means for actuating the braking elements, means coupling the mechanical means to the pressure producing means, and means responsive to pressure in the pressure actuated means for uncoupling the mechanical means from the pressure producing means during a normal operation of the latter, said uncoupling means comprising a link connected to the pressure producing means, a lever connected to the mechanical means, a pin slidably mounted in said lever and resiliently urged in a direction to couple said link to said lever, and means operated by the pressure fluid to slide said pin in the opposite direction.

5. A braking system comprising a fluid pressure producing device, an actuator therefor, fluid pressure actuated motors connected to the device, braking elements actuated by the motors, mechanical means for actuating the braking elements, a rock shaft, means for rocking the shaft, linkage connecting the shaft to the mechanical means, a connection between the shaft and the actuator for the pressure producing device, and means responsive to pressure created by the pressure producing device for rendering the connection ineffective during a normal operation of the pressure producing device.

6. A braking system comprising a fluid pressure producing device, an operating lever therefor, fluid pressure actuated motors connected to the device, braking elements actuated by the motors, actuating levers for the braking elements, a rock shaft, a manually operated lever for rocking the shaft, linkage connecting the shaft to the actuating levers, an arm on the shaft, a connection between the arm and the operating lever for the pressure producing device, and means on the arm operative by the pressure created by the pressure producing device for rendering the connection inoperative for the transmission of power during effective operation of the fluid pressure device.

7. A vehicle braking system comprising a set of brakes, a brake operating gear having a hand-actuated lever, a brake operating gear having a foot-actuated lever, said two brake operating gears being normally independently operable, and means for coupling the foot-actuated lever with the hand-actuated operating gear upon failure of the brake operating gear having the foot-actuated lever, said coupling means being effective without release of the brakes if said failure takes place while the brakes are applied.

8. A brake mechanism comprising in combination, foot and hand operated levers, a friction device, mechanical linkage connecting the device with the hand operated lever, fluid medium means for operating the friction device connected with the foot operated lever, means normally connected with the foot operated lever and having a lost motion connection with said mechanical linkage whereby operation of either of the hand or foot operated levers does not move the other, and fluid responsive means operated by said fluid medium means for disconnecting the mechanical linkage from said foot operated lever, said disconnecting means being effective in case of failure of the fluid medium means while the friction device is applied thereby to reconnect the mechanical linkage to the foot operated lever without releasing the friction device.

WILLIAM E. FIELDS.